United States Patent
Setton et al.

(10) Patent No.: US 8,595,705 B2
(45) Date of Patent: Nov. 26, 2013

(54) INSTRUMENTED APPLICATION IN A MOBILE DEVICE ENVIRONMENT

(75) Inventors: Eric Setton, Palo Alto, CA (US); Yixin Yang, Beijing (CN)

(73) Assignee: TangoMe, Inc., Mountain View, CA (US)

( * ) Notice: Subject to any disclaimer, the term of this patent is extended or adjusted under 35 U.S.C. 154(b) by 393 days.

(21) Appl. No.: 12/970,877

(22) Filed: Dec. 16, 2010

(65) Prior Publication Data

US 2012/0159456 A1 Jun. 21, 2012

(51) Int. Cl.
*G06F 9/44* (2006.01)

(52) U.S. Cl.
USPC .......................................................... 717/130

(58) Field of Classification Search
USPC .......................................................... 717/130
See application file for complete search history.

(56) References Cited

U.S. PATENT DOCUMENTS

| | | | |
|---|---|---|---|
| 7,788,644 B2 * | 8/2010 | Koduru et al. | 717/127 |
| 7,831,265 B1 * | 11/2010 | Shen et al. | 455/464 |
| 7,877,461 B1 * | 1/2011 | Rimmer | 709/217 |
| 8,296,445 B1 * | 10/2012 | Hackborn et al. | 709/228 |
| 2006/0218533 A1 * | 9/2006 | Koduru et al. | 717/124 |
| 2008/0082968 A1 * | 4/2008 | Chang et al. | 717/128 |
| 2008/0320526 A1 * | 12/2008 | Franceschini et al. | 725/62 |
| 2009/0228838 A1 * | 9/2009 | Ryan et al. | 715/853 |
| 2009/0228873 A1 * | 9/2009 | Drukman et al. | 717/128 |
| 2009/0307106 A1 * | 12/2009 | Gupta et al. | 705/26 |
| 2010/0232292 A1 * | 9/2010 | Joung et al. | 370/230 |
| 2011/0010701 A1 * | 1/2011 | Cooper et al. | 717/175 |
| 2011/0010705 A1 * | 1/2011 | Adams et al. | 717/178 |
| 2011/0055347 A1 * | 3/2011 | Hu et al. | 709/217 |
| 2011/0191752 A1 * | 8/2011 | Cleraux et al. | 717/129 |

* cited by examiner

*Primary Examiner* — Don Wong
*Assistant Examiner* — Theodore Hebert

(57) ABSTRACT

A method for utilizing an instrumented application in a mobile device environment. The method includes instrumenting an application to generate an instrumented application configured for use in the mobile device environment, obtaining authorization from a governing body for use of the instrumented application in the mobile device environment, and directing the instrumented application to cause a mobile device to operate according to a first setting. The first setting is invoked without requiring further authorization by the governing body.

39 Claims, 6 Drawing Sheets

300

```
ACCESS AN APPLICATION FOR USE IN A MOBILE DEVICE ENVIRONMENT
310
```

```
INSTRUMENT THE APPLICATION TO GENERATE AN INSTRUMENTED
APPLICATION CONFIGURED FOR USE IN THE MOBILE DEVICE
ENVIRONMENT, THE INSTRUMENTED APPLICATION CONFIGURED TO CAUSE
A MOBILE DEVICE TO OPERATE ACCORDING TO A FIRST SETTING, WHEREIN
THE INSTRUMENTED APPLICATION IS FURTHER CONFIGURED TO INVOKE
THE FIRST SETTING AFTER RECEIVING AUTHORIZATION OF THE
INSTRUMENTED APPLICATION BY A GOVERNING BODY, AND WITHOUT
REQUIRING FURTHER AUTHORIZATION BY THE GOVERNING BODY
320
```

```
┌─────────────────────────────────────────────────────────────┐
│ INSTRUMENT AN APPLICATION TO GENERATE AN INSTRUMENTED       │
│ APPLICATION CONFIGURED FOR USE IN THE MOBILE DEVICE ENVIRONMENT │
│                          410                                │
└─────────────────────────────────────────────────────────────┘
                              │
                              ▼
┌─────────────────────────────────────────────────────────────┐
│ OBTAIN AUTHORIZATION FROM A GOVERNING BODY FOR USE OF THE   │
│ INSTRUMENTED APPLICATION IN THE MOBILE DEVICE ENVIRONMENT   │
│                          420                                │
└─────────────────────────────────────────────────────────────┘
                              │
                              ▼
┌─────────────────────────────────────────────────────────────┐
│ DIRECT THE INSTRUMENTED APPLICATION TO CAUSE A MOBILE DEVICE TO │
│ OPERATE ACCORDING TO A FIRST SETTING, WHEREIN THE FIRST SETTING │
│ IS INVOKED WITHOUT REQUIRING FURTHER AUTHORIZATION BY THE   │
│                    GOVERNING BODY                           │
│                          430                                │
└─────────────────────────────────────────────────────────────┘
```

```
┌─────────────────────────────────────────────────────────────┐
│ DIRECT THE INSTRUMENTED APPLICATION TO CAUSE THE MOBILE DEVICE │
│           TO OPERATE ACCORDING TO A FIRST SETTING            │
│                             610                              │
└─────────────────────────────────────────────────────────────┘
                              │
                              ▼
┌─────────────────────────────────────────────────────────────┐
│      OPERATE THE MOBILE DEVICE ACCORDING TO THE FIRST SETTING │
│                             620                              │
└─────────────────────────────────────────────────────────────┘
                              │
                              ▼
┌─────────────────────────────────────────────────────────────┐
│    ANALYZE PERFORMANCE INFORMATION CORRESPONDING TO THE      │
│  OPERATION OF THE MOBILE DEVICE OPERATING WITH THE FIRST SETTING │
│                             630                              │
└─────────────────────────────────────────────────────────────┘
```

FIG. 6

INSTRUMENTED APPLICATION IN A MOBILE DEVICE ENVIRONMENT

BACKGROUND

In various computing environments, improved versions of applications are developed based on testing and analysis of prior versions of applications operating on client devices. Moreover, the computing environments are not regulated. Therefore, once the improved versions of applications are completed, the client devices can be updated with the improved versions at anytime.

However, some computing environments are regulated. For example, a regulating body determines if and when an application is available for use by client devices. As a result, the client devices may not be updated with an improved version of the application. Accordingly, the development of improved versions of applications is impeded.

BRIEF DESCRIPTION OF THE DRAWINGS

FIG. 3 illustrates an example of a method for instrumentation of an application for use in a mobile device environment, in accordance with an embodiment of the present invention.

FIG. 4 illustrates an example of a method for utilizing an instrumented application in a mobile device environment, in accordance with an embodiment of the present invention.

FIG. 6 illustrates an example of a method for controlling a mobile device, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In some mobile device environments, applications for use by client devices are regulated by a regulation body. For example, applications developed for Apple Inc. iPhone's must be approved by Apple Inc. before the applications are available on Apple's App Store for downloading by the iPhone. In another example, the most recent versions of applications developed for client devices operating the Android operating are tracked by the Android Market.

As a result of the regulation, it is difficult and may be impossible to update client devices with new versions of the applications based on the most recent testing and analysis of the current applications operating on the client devices.

Instrumentation enables the ability for analysis of current applications operating on client devices without requiring updating the client devices with new versions of the applications after the applications are approved by the governing body. In general, instrumentation (or code instrumentation) is a method for analyzing and evaluating program code performance.

Figure 1:
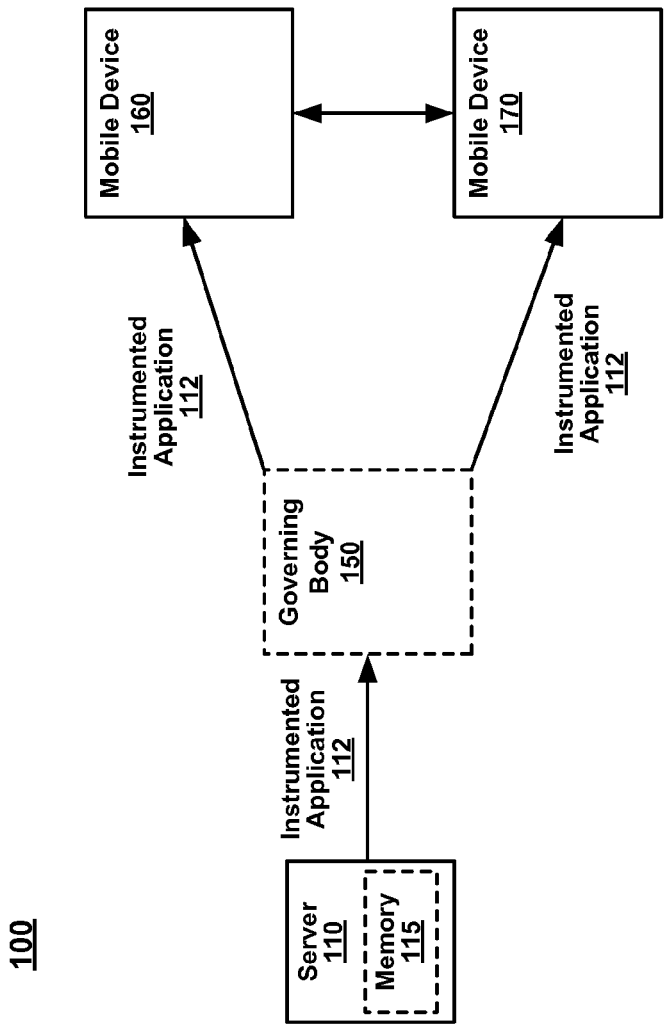
FIGS. 1 and 2 illustrate examples of a mobile device environment, in accordance with embodiments of the present invention.

FIG. 1 depicts an embodiment of system 100. System 100 includes server 110 and mobile devices 160 and 170. System 100 is a mobile device environment, wherein governing body 150 authorizes or certifies instrumented application 112 for subsequent use in the mobile device environment. Server 110 can be any computing system that is able to be communicatively coupled to mobile devices 160 and/or 170.

Instrumented application 112 is any instrumented application that is configured to be executed on mobile device 160 and/or mobile device 170. In general, instrumented application 112 is designed to perform singular or multiple related specific tasks on mobile devices 160 and 170. In particular, instrumented application 112 is configured to cause a mobile device to operate according to different settings, which will be described in detail below. In one embodiment, instrumented application 112 is an instrumented teleconference application to enable user's of mobile devices 160 and 170 to perform a teleconference with one another via mobile devices 160 and 170.

Server 110 includes memory 115. In one embodiment, governing body 150 is able to access instrumented application 112 stored in memory 115. In another embodiment, governing body 150 is able to access instrumented application from another source such as a database. It should be appreciated that the instrumentation of an application to generate instrumented application 112 can be performed by an instrumenting means suited for application developers.

Governing body 150 determines whether or not applications are authorized to be downloaded onto mobile devices 160 and 170. For example, governing body 150 is Apple Inc. and determines that instrumented application 112 is able to be downloaded onto mobile devices 160 and/or 170 from an Apple App Store. In another example, governing body 150 is the Android Market that tracks the latest version of instrumented application 112 available to be downloaded onto mobile devices 160 and/or 170.

Mobile devices 160 and 170 are any mobile devices that are able communicate with one another and also allow the operation of applications (e.g., instrumented teleconferencing applications). Moreover, at least one of mobile devices 160 and 170 are able to communicate with server 110. Mobile devices 160 and 170 can be, but are not limited to, a smart phone, a personal digital assistant (PDA) and the like. In one embodiment, mobile devices 160 and 170 are the same mobile device. In another embodiment, mobile devices 160 and 170 are different from one another.

Figure 2:
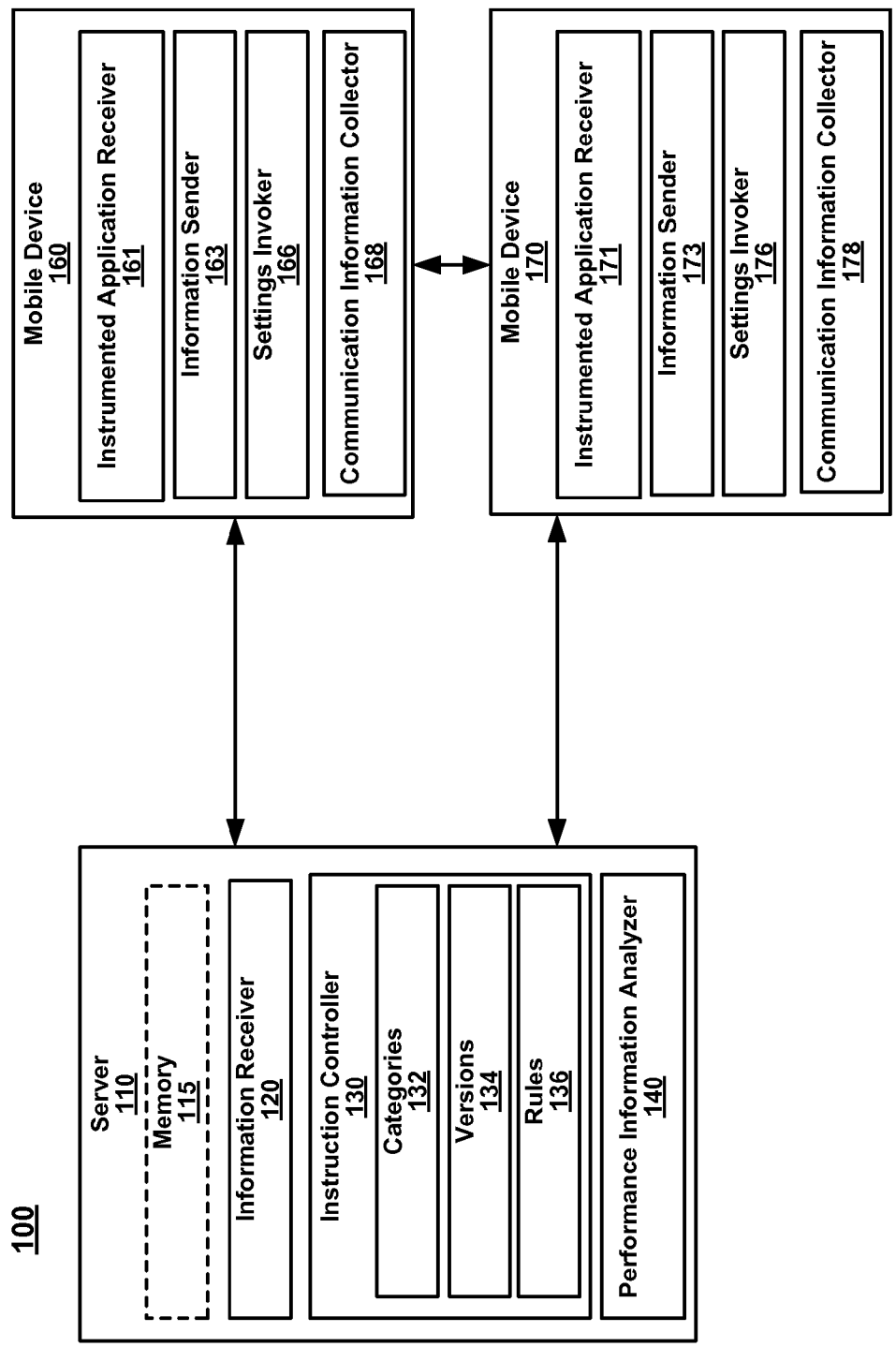

FIGS. 1 and 2 depict mobile devices 160 and 170. However, system 100 can include any number of mobile devices that are able to communicate with one another. For the sake of clarity and brevity, the following discussion will focus primarily on a communication between mobile devices 160 and 170.

The following discussion will first describe the structure and components of server 110 and mobile devices 160 and 170. Then the discussion will describe the functionality of the structure and components of server 110 and mobile devices 160 and 170 during use in the mobile device environment.

FIG. 2 depicts an embodiment of system 100. Server 110 includes memory 115, information receiver 120, instruction controller 130, and performance information analyzer 140.

Memory 115, information receiver 120, instructor controller 130, and performance information analyzer 140 are depicted as separate components disposed within server 110. However, it should be appreciated that the components can be fully or partially integrated with one another. Moreover, the components can be distributed in various locations other than server 110.

Information receiver 120 is configured for receiving information from mobile device 160 and/or mobile device 170.

Instruction controller 130 is for controlling instructions for use by an instrumented application configured for operation on mobile devices 160 and 170. The instructions direct instrumented application 112 to cause mobile devices to operate according to different settings.

In one embodiment, instructions are organized hierarchically. For example, into categories 132, versions 134 and rules 136. As such, different rules correspond to different versions. Likewise, different versions correspond to different categories.

Categories 132 can include, but are not limited to, rate control, echo cancellation, video error concealment, audio error concealment, group of pictures structure, etc.

Versions 134 can include, but are not limited to, versions of the different categories, such as algorithm versions, and parameter set versions.

Rules 136 can include, but are not limited to, parameter settings, and policy settings of the version of a particular category.

In various embodiments, server 110 sends instructions to any mobile device at anytime. For example, through an exchange of messages between the client and the server. In one embodiment, the instructions are generated a priori. In another embodiment, the instructions are dynamically generated.

Performance information analyzer 140 is configured for analyzing performance information corresponding to operation of mobile device 160 and/or mobile device 170 operating with certain settings. In one embodiment, performance information analyzer 140 analyzes communication information corresponding to a communication between mobile devices.

In one embodiment, the analysis is a statistical analysis of information collected over time and over a set of devices. For example, a first set of mobile devices operate according to a first set of settings, a second set of mobile devices operating according to a second set of settings, and so on. As such, a statistical analysis is performed on the collected information of the different sets of mobile devices operating according to the different sets of settings.

Mobile device 160 includes instrumented application receiver 161, information sender 163, settings invoker 166 and communication information collector 168.

Similarly, mobile device 170 includes instrumented application receiver 171, information sender 173, settings invoker 176, and communication information collector 178.

Instrumented application receivers 161 and 171 are for receiving an instrumented application. In other words, instrumented application receivers 161 and 171 receive or access instrumented application 112. Accordingly, instrumented application 112 is able to operate on mobile device 160 and 170 once it is accessed.

Information sender 163 is for sending information associated with mobile device 160 to information receiver 120. In particular, information sender 163 is for sending information collected by communication collector 168, which will be described in detail below.

Information sender 173 is for sending information associated with mobile device 170 to mobile device 160. In one embodiment, information sender 173 sends information associated with mobile device 170 to information receiver 120. In particular, information sender 173 is for sending information collected by communication collector 178, which will be described in detail below. In various embodiments, information senders 163 and 173 also send login requests, software and hardware versions, memory information, processor information and the like.

Settings invoker 166 is configured for invoking settings such that instrumented application 112 operates according to the settings on mobile device 160.

Likewise, settings invoker 176 is configured for invoking settings such that instrumented application 112 operates according to the settings on mobile device 170. It should be appreciated that the setting are invoked after receiving authorization of instrumented application 112 by a governing body 150.

The instrumented application 112 enables a mobile device to operate at different settings. As such, the mobile devices operate at different settings without requiring changes to the mobile devices and instrumented applications.

In general, settings are algorithms or policies that facilitate in controlling the operation of the mobile devices. Settings can be, but are not limited to, audio frame rate control, audio frame rate control, packet loss threshold, frame rate threshold, transmission rate threshold, IP addresses, etc.

Settings of instrumented application 112 can be invoked in a plurality of different ways. In one embodiment, settings are invoked automatically during use of the mobile device. In another embodiment, settings are invoked in response to instructions from server 110.

Calls or communication between mobile devices 160 and 170 are governed by the settings of instrumented application 112. In one embodiment, prior to mobile device 160 calling mobile device 170, mobile device receives instructions from server 110 such that some settings are to be tried out by mobile device 160. When device 160 calls 170, it communicates the information to mobile device 170 and with this shared knowledge drives the way the call is conducted.

In another embodiment, when mobile device 160 is calling mobile device 170, mobile device 160 queries server 110 for the right set of instructions to invoke the proper settings and sends those across to 170 to drive the way the call is connected.

In a further embodiment, server 110 communicates directly with mobile device 170. Accordingly, it is not necessary for mobile device 160 to send instructions to mobile device 170.

In another embodiment, mobile device 160 receives instructions from an intermediary mobile device (e.g., mobile device 170).

Communication information collectors 168 and 178 are for collecting communication information corresponding to a communication between mobile devices 160 and 170. The communication information can be collected during or after the communication between mobile devices 160 and 170. The communication information is sent via information senders 163 and/or 172 to performance information analyzer 140.

In general, the information collected and sent to the server includes some specific feedback (or performance data) associated with some of the settings (e.g., policies/algorithms) that instrumented application 112 is trying out. For example, after receiving instructions from server 110. In various embodiments, the communication information can include, but is not limited to, packet loss, audio rate, video rate, etc.

In one embodiment, mobile device 160 does not include communication information collector 168. Accordingly, communication information collector 178 collects the communication information corresponding to a communication between mobile device 160 and mobile device 170. In another embodiment, mobile device 170 does not include communication information collector 178. Accordingly, communication information collector 168 collects the communication information corresponding to a communication between mobile device 160 and mobile device 170.

Performance information analyzer 140 analyzes the collected communication information between mobile devices 160 and 170 received from information senders 163 and/or 173. In general, performance information analyzer 140 analyzes the collected communication information based on the invoked settings of instrumented application 112. In other words, the different communication strategies implemented between mobile devices 160 and 170 are analyzed and tested to determine how the different implemented strategies performed during the communication between mobile devices 160 and 170.

For example, performance information analyzer 140 determines how invoked settings affect packet delay. Also, performance information analyzer 140 determines how invoked settings affect the quality of a teleconferencing communication.

In one embodiment, performance information analyzer 140 determines the perceived or computational quality of the communication between the mobile devices. For example, if audio rate is increased and video rate is decreased, performance information analyzer 140 determines the perceived or computational quality of the communication between the mobile devices based on those particular settings.

The analyzed information is then used by instruction controller 130 to facilitate in generating improved instructions for subsequent calls between mobile devices 160 and 170.

FIG. 3 depicts an embodiment of a method 300 for instrumentation of an application for use in a mobile device environment. In various embodiments, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed at least by system 100, as described in FIGS. 1 and 2.

At 310 of method 300, an application is accessed for use in a mobile device environment. For example, a teleconferencing application is accessed for use in mobile device 160. It is understood that the accessing of the application includes accessing at least a portion of the application and does necessarily mean accessing the entire application. However, in some embodiments, accessing the entire application can occur.

At 320 of method 300, an instrumented application is generated, the instrumented application is configured for use in the mobile device environment, the instrumented application configured to cause a mobile device to operate according to a first setting, wherein the instrumented application is further configured to invoke the first setting after receiving authorization of the instrumented application by a governing body, and without requiring further authorization by the governing body.

For example, a teleconferencing application is instrumented to such that the instrumented teleconferencing application is configured for use in a mobile device environment. The instrumented teleconferencing application is configured to cause mobile device 160 to operate according to a first setting (e.g., high audio frame rate).

In one embodiment, the instrumented application is uniquely directed to invoke the first setting on the first mobile device and a second setting on a second mobile device, wherein said first setting is different from the second setting. For example, instrumented application 112 is uniquely directed to invoke a first setting on mobile device 160 and a second setting on mobile device 170, wherein the first setting is different from the second setting.

In another embodiment, the instrumented application is uniquely directed to invoke different settings which are different from the first setting on a plurality of mobile devices. For example, instrumented application 112 is directed to invoke different setting (e.g., packet loss threshold, frame rate threshold) that are different from the first setting on a plurality of mobile devices.

In another embodiment, the instrumenting application is enabled to automatically invoke different settings on different mobile devices after receiving authorization of said application by the governing body. For example, a first setting of the audio having a higher frame rate than the video is automatically invoked on a first set of mobile devices and a second setting of the video having a higher frame rate than the audio is automatically invoked on a second set of mobile devices.

In a further embodiment, the instrumented application is enabled to automatically invoke different settings at predetermined intervals on different mobile devices after receiving authorization of the application by the governing body. For example, a first setting of a first packet threshold is automatically invoked on a first set of mobile devices once a week. Additionally, a second setting of a second packet threshold is automatically invoked on a second set of mobile devices once a month. Accordingly, the instrumented application enables different mobile devices to operate at different settings and different times.

In one embodiment, the instrumented application is enabled to invoke different settings on different mobile devices in response to received instructions, and after receiving authorization of the instrumented application by the governing body. For example, different settings (e.g., time delays and increased audio rate) are invoked on different mobile devices in response to instructions received from server 110.

In another embodiment, the instrumented application is enabled to invoke different settings on at least three groupings of mobile devices, and after receiving authorization of the instrumented application by the governing body. For example, a first setting is invoked on 1,000 mobile devices, a second setting is invoked on another 1,000 mobile device, and a third setting is invoked on an additional 1,000 devices. Accordingly, the first, second and third setting can operate on the respective mobile devices in parallel and/or concurrently. As a result, different strategies are able to be compared in parallel and/or concurrently.

FIG. 4 depicts an embodiment of a method 400 for utilizing authorized instrumented code in a mobile device environment. In various embodiments, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 400 is performed at least by system 100, as described in FIGS. 1 and 2.

At 410, an application is instrumented to generate an instrumented application configured for use in the mobile device environment. For example, instrumented application 112 is for use in a mobile device environment.

At 420, authorization is obtained from a governing body for use of the instrumented application in the mobile device environment. For instance, authorization of instrumented application 112 is obtained from an application store for use of the instrumented application in mobile devices 160 and 170.

At 430, the instrumented application is directed to cause a mobile device to operate according to a first setting, wherein the first setting is invoked without requiring further authorization by the governing body.

For example, instrumented application is directed to cause mobile device 160 to operate to a first setting. The first setting is invoked without requiring additional authorization from an App Store.

In one embodiment, the instrumented application is directed to cause a first grouping of mobile devices (e.g., a first set of mobile devices) to operate according to the first setting. In another embodiment, the instrumented application is directed to cause a second grouping of mobile devices (e.g., a second set of mobile devices) to operate according to a second setting.

Figure 5:
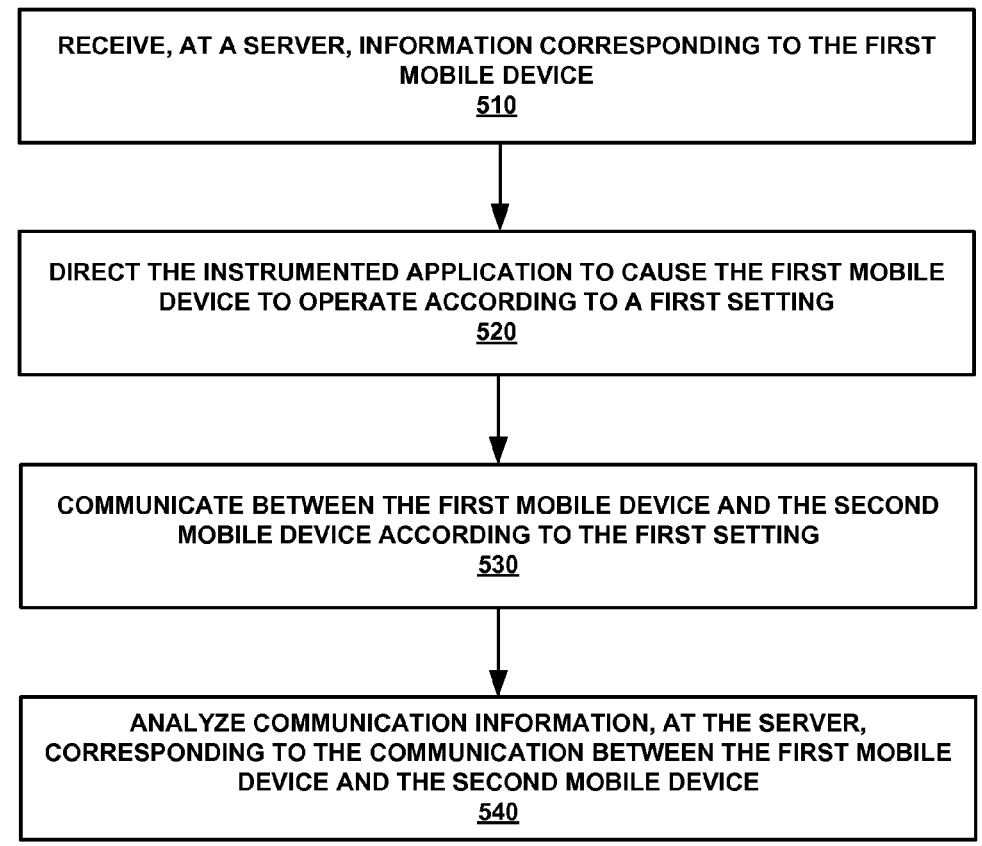
FIG. 5 illustrates an example of a method for controlling and monitoring a communication between mobile devices, in accordance with an embodiment of the present invention.

FIG. 5 depicts an embodiment of a method 500 for controlling and monitoring a communication between a first mobile device and a second mobile device, wherein the method utilizes an instrumented application configured to operate on the first mobile device. In various embodiments, method 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 500 is performed at least by system 100, as described in FIGS. 1 and 2.

At 510, receive, at a server, information corresponding to the first mobile device. For example, information corresponding to mobile device 160 is sent by information receiver 163 and received by information receiver 120.

At 520, the instrumented application is directed to cause the first mobile device to operate according to a first setting. The first mobile device and/or the second mobile devices are directed to operate in a variety of ways. Examples are described below.

The instrumented application is directed to cause the first mobile device to operate according to a first setting after receiving authorization of the instrumented application by a governing body.

The instrumented application is directed to cause the second mobile device to operate according to a second setting.

The instrumented application is automatically directed to cause the first mobile device to operate according to a first setting. For example instrumented application 112 is automatically directed to cause mobile device 160 to operate according to a first setting once instrumented application 112 is executed on a mobile device.

The instrumented application is directed to cause the first mobile device to operate according to a first setting in response to received instructions. For example, instrumented application 112 is directed to cause mobile device 160 to operate according to a first setting in response to received instructions from server 110.

The instrumented application is directed to cause the first mobile device to operate according to a first setting in response at predetermined intervals. For example, a predetermined interval is once very two months.

The instrumented application is directed to cause the first mobile device to operate according to a first setting in response to different received instructions. For example, a first setting is invoked in response to first received instructions. Subsequently, a second setting is invoked in response second received instructions. In such an example, the second instructions are dynamically generated based on communication information received during a call between mobile devices 160 and 170.

At 530, a communication occurs between the first mobile device and the second mobile device according to the first setting. For example, a communication or call occurs between mobile devices 160 and 170. In one embodiment, a teleconference occurs between mobile devices 160 and 170 based a first setting in response to received instructions from server 110.

At 540, communication information is analyzed, at the server, corresponding to the communication between the first mobile device and the second mobile device. For example, communication information is analyzed by performance information analyzer 140. In such an example, the communication information is collected at mobile device 160 and/or mobile device 170.

In one embodiment, information corresponding to the second mobile device is received via the first mobile device at the server. For example, communication information collected at communication collector 178 is sent to server 110 via mobile device 160.

FIG. 6 depicts an embodiment of a computer-implemented method 600 for controlling a mobile device, wherein said computer-implemented method utilizes an instrumented application operating on said mobile device. In various embodiments, method 600 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 600 is performed at least by system 100, as described in FIGS. 1 and 2.

At 610, the instrumented application are directed to cause the mobile device to operate according to a first setting. For example, instrumented application 112 is directed to cause mobile device 160 to operate according to a first setting.

In one embodiment, the instrumented application is directed to cause a second mobile device to operate according to a second setting. For example, instrumented application 112 is directed to cause mobile device 170 to operate according to a second setting.

In another embodiment, the instrumented application is directed to cause a first grouping of mobile devices to operate according to the first setting. In a further embodiment, the instrumented application is directed to cause a second grouping of mobile devices to operate according to a second setting.

In another embodiment, the instrumented application is directed to cause more than two groups of mobile devices to operate concurrently according to different settings without requiring additional authorization of the instrumented application by the governing body.

At 620, the mobile device operates according to the first setting. For example, mobile device 160 operates according to the first setting.

At 630, performance information is analyzed corresponding to the operation of the mobile device operating with the first setting. For example, computationally perceived audio/visual information is analyzed corresponding to the operation of the mobile device operating with the first setting.

Various embodiments of the present invention are thus described. While the present invention has been described in particular embodiments, it should be appreciated that the present invention should not be construed as limited by such embodiments, but rather construed according to the following claims.

The invention claimed is:

1. A computer-implemented method for instrumentation of an application to operate on at least a first mobile device in a mobile device environment for use in said mobile device environment, said method comprising:
accessing, by a server, said application; and
instrumenting, by said server, said application to generate an instrumented application configured to operate on said at least a first mobile device, said instrumented application configured to: invoke said first set of settings subsequent to authorization of operation of said instrumented application on said at least a first mobile device being received by a governing body, thereby causing said at least a first mobile device to operate according to said first set of settings; and subsequent to said first set of settings being invoked on said at least a first mobile device and in response to an analysis of performance information associated with said at least a first mobile device, wherein said performance information comprises communication information corresponding to a teleconferencing communication between said first mobile device and a second mobile device of said at least a first mobile device, cause said at least a first mobile device to operate according to a second set of settings, wherein further authorization by said governing body need not be obtained for operation of said instrumented application on said at least a first mobile device according to said second set of settings, wherein said second set of settings is different from said first set of settings.

2. The computer-implemented method of claim 1, wherein said instrumenting, by said server, said application comprises:
instrumenting said application such that said instrumented application can be directed to invoke said first set of settings on said first mobile device and said second set of settings on said second mobile device.

3. The computer-implemented method of claim 1, wherein said instrumenting, by said server, said application comprises:
instrumenting said application to enable said instrumented application to automatically invoke different settings at predetermined intervals on different mobile devices.

4. The computer-implemented method of claim 1, wherein said instrumenting, by said server, said application comprises:
instrumenting said application to enable said instrumented application to invoke different settings on different mobile devices in response to received instructions.

5. The computer-implemented method of claim 1, wherein said instrumenting, by said server, said application comprises:
instrumenting said application to enable said instrumented application to invoke different settings on at least three groupings of mobile devices.

6. A computer-implemented method for utilizing an instrumented application in a mobile device environment, said computer-implemented method comprising:
instrumenting, by a server, an application to generate an instrumented application configured to operate on at least a first mobile device;
obtaining, by said server, authorization from a governing body for use of said instrumented application in said mobile device environment, wherein said authorization comprises authorization to allow said instrumented application to invoke a first set of settings on said at least a first mobile device, thereby causing said at least a first mobile device to operate according to said first set of settings; and
subsequent to said first set of settings being invoked on said at least a first mobile device and in response to an analysis of performance information associated with said at least a first mobile device, wherein said performance information comprises communication information corresponding to a teleconferencing communication between said first mobile device and a second mobile device of said at least a first mobile device, directing, by said server, said instrumented application to cause said at least a first mobile device to operate according to a second set of settings, wherein further authorization by said governing body need not be obtained for operation of said instrumented application on said at least a first mobile device according to said second set of settings, wherein said second set of settings is different from said first set of settings.

7. A non-transitory computer-readable storage medium comprising instructions stored thereon which, when executed by a computer system, cause said computer system to perform a method for instrumentation on an application for use on at least a first mobile device of a mobile device environment, said method comprising:
receiving, by an information receiver of said computer system, and subsequent to a first set of settings being invoked on said at least a first mobile device for which an authorization from a governing body was obtained for operation thereon, information corresponding to an operation of said instrumented application on said first mobile device, wherein said information comprises performance information analyzed by a performance analyzer, said performance information including communication information corresponding to a teleconferencing communication between said first mobile device and a second mobile device of said at least a first mobile device;
controlling, by an information controller of said computer system, instructions to be used by an instrumented application that is configured for operation on said at least a first mobile device, wherein said instructions direct said instrumented application to cause said at least a first mobile device to operate according to a a second set of settings, wherein further authorization by said governing body need not be obtained for operation of said instrumented application on said at least a first mobile device according to said second set of settings, wherein said second set of settings is different from said first set of settings.

8. The method of claim 7, wherein said information receiver is for receiving information associated with said second mobile device via said first mobile device.

9. The method of claim 7, wherein said information receiver is for receiving information directly from said second mobile device.

10. The method of claim 7, wherein said instructions are controlled based on said information from said first mobile device.

11. The method of claim 7, wherein said instructions are controlled based on said information associated with said second mobile device.

12. The method of claim 7, wherein said instructions are controlled based on said analyzed performance information.

13. The method of claim 7, wherein said instruction controller is for dynamically controlling said instructions.

14. The method of claim 7, wherein said instruction controller is for controlling a hierarchical set of instructions.

15. The method of claim 7, wherein said instruction controller controls instructions selected from a group consisting of: categories, versions and rules.

16. A first mobile device comprising:
an instrumented application receiver for receiving an instrumented application, wherein a governing body authorized an operation of said instrumented application on said first mobile device, wherein said operation comprises an operation of a first set of settings on said first mobile device;
a performance information collector for collecting performance information corresponding to an operation of said first mobile device operating according to said first set of settings, wherein said performance information comprises communication information corresponding to teleconferencing communication between said first mobile device a second mobile device; and
a settings invoker for invoking, subsequent to said first set of settings being invoked on said at first mobile device and in response to an analysis of said performance information, a second set of settings, wherein said instrumented application operates on said first mobile device and causes said first mobile device to operate according to said second set of settings wherein further authorization by said governing body need not be obtained for operation of said instrumented application on said first mobile device according to said second set of settings.

17. The first mobile device of claim 16, wherein said second set of settings is different from said first set of settings.

18. The first mobile device of claim 16, wherein said settings invoker is for invoking different settings such that said instrumented application operates according to said different settings.

19. The first mobile device of claim 16, wherein said settings invoker is for invoking different settings at predetermined intervals such that said instrumented application operates according to said different settings at said predetermined intervals.

20. The first mobile device of claim 16, wherein said teleconferencing communication is between said first mobile device and a second mobile device.

21. The first mobile device of claim 20, wherein said teleconferencing communication is between said first mobile device and said second mobile device is selected from a group consisting of: video rate control and audio rate control.

22. The first mobile device of claim 16, wherein said settings invoker is configured to receive instructions from an intermediary device such that said first set of settings is invoked in response to received instructions.

23. A mobile device environment system comprising:
a server;
at least a first mobile device; and
a second mobile device of said at least a first mobile device;
wherein said server comprises:
an instruction controller for controlling instructions for use by an instrumented application configured for operation on said at least a first mobile, wherein a governing body authorized an operation of said instrumented application on said at least a first mobile device, wherein said operation comprises an operation of a first set of settings on said at least a first mobile device, wherein said instructions direct said instrumented application to cause said at least a first mobile device to operate according to a second set of settings; and
a performance information analyzer for analyzing performance information corresponding to an said operation of said at least a first mobile device operating with said first set of settings, wherein said performance information comprises communication information corresponding to teleconferencing communication between said first mobile device and said second mobile device,
wherein said first mobile device comprises:
a settings invoker for invoking said second set of settings, wherein said second set of settings is invoked subsequent to said first set of settings being invoked on said at least a first mobile device and in response to an analysis of said performance information, wherein further authorization by said governing body need not be obtained for operation of said instrumented application on said at least a first mobile device according to said second set of settings, wherein said second set of settings is different from said first set of settings.

24. The mobile device environment system of claim 23, wherein said second mobile device comprises:
a settings invoker for invoking said second set of settings such that said instrumented application causes said second mobile device to operate according to said second set of settings, wherein said second set of settings is invoked subsequent to said first set of settings being invoked on said at least a first mobile device and in response to an analysis of said performance information.

25. The mobile device environment system of claim 23, wherein said second mobile device comprises:
a performance information collector for collecting said performance information corresponding to an operation of said second mobile device operating according to said second set of settings.

26. A computer-implemented method for controlling and monitoring a communication between a first mobile device and a second mobile device, wherein said computer-implemented method utilizes an instrumented application configured to operate on said first mobile device, said method comprising:
receiving, at a server, performance information corresponding an operation of said first mobile device according to a first set of settings invoked by said instrumented application, wherein authorization was obtained by a governing body to operate said first set of settings by said instrumented application on said first mobile device, wherein said performance information comprises communication information corresponding to a teleconferencing communication between said first mobile device and said second mobile device;

subsequent to said first set of settings being invoked on said first mobile device and in response to an analysis of said performance information, directing, by said server, said instrumented application to cause said first mobile device to operate according to a second set of settings, wherein further authorization by said governing body need not be obtained for operation of said instrumented application on said first mobile device according to said second set of settings, wherein said second set of settings is different from said first set of settings;

communicating, via teleconference, between said first mobile device and said second mobile device, according to said second set of settings; and analyzing, at said server, said communication information corresponding to said teleconferencing communication between said first mobile device and said second mobile device according to said second set of settings.

27. The computer-implemented method of claim 26, further comprising:
receiving, at said server, information corresponding to said second mobile device via said first mobile device.

28. The computer-implemented method of claim 26, wherein said directing comprises:
directing, by said server, said instrumented application to cause said second mobile device to operate according to said second set of settings a.

29. The computer-implemented method of claim 26, wherein said directing comprises:
automatically directing, by said server, said instrumented application to cause said first mobile device to operate according to said second set of settings.

30. The computer-implemented method of claim 26, wherein said directing comprises:
directing, by said server, said instrumented application to cause said first mobile device to operate according to said second set of settings in response to received instructions.

31. The computer-implemented method of claim 26, wherein said directing comprises:
directing, by said server, said instrumented application to cause said first mobile device to operate according to said first second set of settings at predetermined intervals.

32. The computer-implemented method of claim 26, wherein said directing comprises:
directing, by said server, said instrumented application to cause said first mobile device to operate according to said second set of settings in response to different received instructions.

33. The computer-implemented method of claim 26, further comprising:
collecting communication information at said first mobile device.

34. The computer-implemented method of claim 26, further comprising:
collecting communication information at said second mobile device.

35. A computer-implemented method for controlling at least a first mobile device, wherein said computer-implemented method utilizes an instrumented application operating on said at least a first mobile device, said method comprising:
subsequent to a first set of settings being invoked on said at least a first mobile device and in response to an analysis of performance information, directing, by a server, said instrumented application to cause said at least a first mobile device to operate according to a second set of settings, wherein authorization was obtained by a governing body to operate said first set of settings by said instrumented application on said at least a first mobile device, and wherein further authorization by said governing body need not be obtained for operation of said instrumented application on said at least a first mobile device according to said second set of settings, wherein said second set of settings is different from said first set of settings, and wherein said performance information comprises communication information corresponding to a teleconferencing communication between said at least a first mobile device and a second mobile device of said as least a first mobile device;

operating said at least a first mobile device according to said second set of settings; and analyzing performance information corresponding to said operation of said at least a first mobile device operating with said second set of settings.

36. The computer-implemented method of claim 35, wherein said directing comprises:
directing said instrumented application to cause a grouping of said at least a first mobile device to operate according to said second set of settings.

37. The computer-implemented method of claim 35, wherein said directing comprises:
directing said instrumented application to cause a grouping of said at least a first mobile device to operate according to said second set of settings.

38. The computer-implemented method of claim 35, wherein said directing comprises:
directing said instrumented application to cause more than two groups of said at least a first mobile device to operate concurrently according to different settings.

39. The computer-implemented method of claim 35, further comprising:
receiving instructions that direct said instrumented application to cause said at least a first mobile device to operate according to said second set of settings.

* * * * *

UNITED STATES PATENT AND TRADEMARK OFFICE
CERTIFICATE OF CORRECTION

PATENT NO. : 8,595,705 B2  
APPLICATION NO. : 12/970877  
DATED : November 26, 2013  
INVENTOR(S) : Eric Setton et al.

Page 1 of 1

It is certified that error appears in the above-identified patent and that said Letters Patent is hereby corrected as shown below:

In the Claims:

Column 13, Claim 28, Line 26, Delete: "settings a."

Insert: --settings.--

Signed and Sealed this  
Twenty-third Day of September, 2014

Michelle K. Lee  
*Deputy Director of the United States Patent and Trademark Office*